(12) United States Patent
Moskun et al.

(10) Patent No.: US 8,279,520 B2
(45) Date of Patent: Oct. 2, 2012

(54) WIDE FIELD OF VIEW LWIR HIGH SPEED IMAGER

(75) Inventors: Eric M. Moskun, Long Beach, CA (US); Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 132 days.

(21) Appl. No.: 12/847,027

(22) Filed: Jul. 30, 2010

(65) Prior Publication Data

US 2012/0026382 A1    Feb. 2, 2012

(51) Int. Cl.
*G02B 13/14* (2006.01)
(52) U.S. Cl. .................. 359/357; 359/355; 359/356
(58) Field of Classification Search .......... 359/350, 359/354–357, 642, 676–690, 745–795
See application file for complete search history.

(56) References Cited

U.S. PATENT DOCUMENTS

| | | | |
|---|---|---|---|
| 3,778,133 A * | 12/1973 | Tatian | ............... 359/356 |
| 4,738,496 A | 4/1988 | Canzek | |
| 5,022,724 A * | 6/1991 | Shechterman | ............ 359/354 |
| 5,148,314 A | 9/1992 | Chen | |
| 5,852,516 A | 12/1998 | Chipper | |
| 5,880,879 A | 3/1999 | Foo | |
| 6,423,969 B1 * | 7/2002 | Amon | ............ 250/339.01 |
| 6,989,537 B2 | 1/2006 | Cook | |
| 7,369,303 B2 * | 5/2008 | Tejada | ............ 359/356 |
| 2010/0046094 A1 | 2/2010 | Asami | |

OTHER PUBLICATIONS

Extended European Search Report AF2/P17178/EP dated Oct. 25, 2011, 8 pages.
Spencer, Harvey M.: "Thermal considerations in the design of a long focal length, low f-number, long wave infrared imager", Proc. SPIE of the International Optical Design Conference 2010, vol. 7652, Jun. 13, 2010, pp. 76521B-76521B-9, XP040521039, DOI: 10.1117/12.866774.

* cited by examiner

*Primary Examiner* — Thong Nguyen
(74) *Attorney, Agent, or Firm* — Daly, Crowley, Mofford & Durkee, LLP

(57) ABSTRACT

Various embodiments provide an optical system including a first lens group having a plurality of lenses, the first lens group being configured to correct for an axial chromatic aberration; a second lens group having a least one lens, the second lens group being disposed adjacent the first lens group; and a third lens group having a plurality of lenses, the third lens group being configured to correct for a lateral chromatic aberration and field curvature, the third lens group being disposed adjacent the second lens group. The first, second and third lens groups are configured to provide a wide field of view greater than approximately 20 deg., and an f-number of less than approximately F/2 in a wavelength range between approximately 8 μm and approximately 12 μm.

15 Claims, 6 Drawing Sheets

WIDE FIELD OF VIEW LWIR HIGH SPEED IMAGER

BACKGROUND

This disclosure pertains to optical imagers in general and in particular to a high speed optical imager having a wide field of view.

Demand for imaging sensors that provide wide area persistent surveillance is increasing. Wide area persistent surveillance often requires high resolution imagery over a large area. However, current infrared imagers or image sensors merely provide large area coverage or provide high resolution but do not provide both a large area coverage and high resolution. In addition, long wavelength infrared (LWIR) imagers require fast f-numbers (i.e., small f-numbers) to produce valuable imagery. Hence, designing a LWIR optical system that combines both large area coverage and high resolution can be challenging. At the present time there are no known imaging system that can provide imaging in the LWIR range (between about 8 µm and about 12 µm) while at the same time provide large area coverage and high resolution imagery.

Conventional systems or methods for providing large or wide area coverage and high resolution imagery rely on (a) stepping or scanning a small, high resolution, field of view (FOV) relatively quickly over the coverage area, or (b) using a switchable FOV where a low resolution wide field of view (WFOV) used to cover the wide area is switched to a narrow field of view (NFOV) to provide a high resolution image of a sub-region of interest within the wide area.

Both of the above configurations (a) and (b) have certain limitations in that they do not provide continuous high resolution data or imagery. In other words, imaging of the entire area is not captured simultaneously. Therefore, some image information within the wide area may be missed, not captured or fully captured during stepping and scanning, in the case of (a), or during zooming to a sub-region of interest within the wide area, in the case of (b). In addition to these limitations, both of these configurations involve adding mechanisms which can be costly and may have reliability concerns.

Therefore, there is a need in the art for optical imagers having a fast f-number that can provide a wide field of view (WFOV) and relatively high resolution in the LWIR range. In this context, a "wide" FOV may be considered, by way of a non-limiting example, to be greater than 20 degrees (for example greater than 40 degrees), and a fast f-number may correspond to an f-number less than about F/2.

SUMMARY

One or more embodiments of the present disclosure provide an optical system including a first lens group comprising a plurality of lenses, the first lens group being configured to correct for an axial chromatic aberration; a second lens group having a least one lens, the second lens group being disposed adjacent the first lens group; and a third lens group having a plurality of lenses, the third lens group being configured to correct for a lateral chromatic aberration, the third lens group being disposed adjacent the second lens group. The first, second and third lens groups are configured to provide a wide field of view greater than approximately 20 deg., and an f-number of less than approximately F/2 in a wavelength range between approximately 8 µm and approximately 12 µm, for example.

These and other features and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of this disclosure, the structural components illustrated herein are drawn to scale. It is to be expressly understood, however, that the drawings are for the purpose of illustration and description only and are not intended as a definition of the limits of the inventive concept. As used in the specification and in the claims, the singular form of "a", "an", and "the" include plural referents unless the context clearly dictates otherwise.

DETAILED DESCRIPTION

Figure 1:
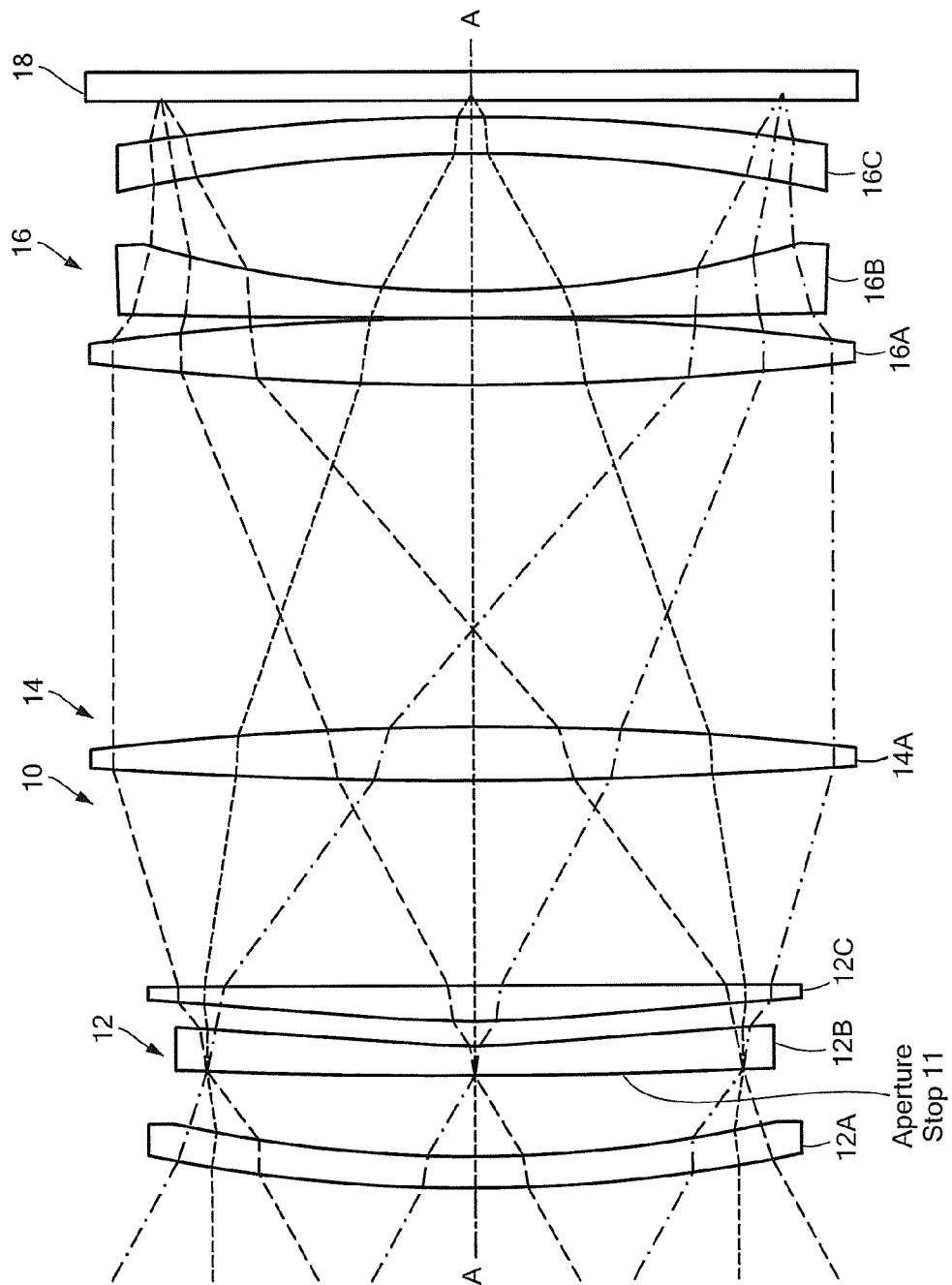
FIG. 1 depicts an optical imaging system having a fast f-number and providing a WFOV and relatively high resolution in the LWIR range, according to one embodiment.

FIG. 1 depicts an optical imaging system having a fast f-number and providing a WFOV and relatively high resolution in the LWIR range, according to one embodiment. Optical system 10 comprises first lens group 12, second lens group 14, and third lens group 16. In one embodiment, first lens group 12, second lens group 14, and third lens group 16 have net positive power. Optical system 10 further includes detector 18 such as, but not limited to, a focal plane array. The detector 18 is selected to be sensitive in the LWIR wavelength range between about 8 µm and about 12 µm. Detector 18 is disposed behind third lens group 16. In one embodiment, detector 18 can be located in focal plane of lens group 16. First lens group 12, second lens group 14 and third lens group 16 capture radiation from a far field and focus the radiation onto detector 18. In one embodiment, second lens group 14 can be disposed adjacent first lens group 12 and third lens group 16 is in turn disposed adjacent second lens group 14.

In one embodiment, first lens group 12 comprises first lens element 12A, second lens element 12B and third lens element 12C. In one embodiment, first lens element 12A has a negative power, second lens element 12B has a negative power and third lens element 12C has a positive power. In one embodiment, lens element 12A and lens element 12C are made from germanium (Ge) and second lens 12B is made from an amorphous material transmitting infrared radiation (AMTIR), such as AMTIR-1 containing Ge (about 33%), As (about 12%) and Se (about 55%). AMTIR-1 is particularly well suited when operating in the LWIR range between about 8 µm and about 12 μm. In one embodiment, lens element 12B has a kineform grating surface (i.e., a diffractive lens). In one embodiment, lens elements 12A and 12C are aspheric. Although first lens group 12 is described above and depicted in FIG. 1 as having three lens elements, first lens group 12 can have any number of lens elements, for example, three, four or more lens elements. In one embodiment, an aperture stop 11 of optical system 10 is provided at a first surface of lens element 12B closest to first lens element 12A.

In one embodiment, second lens group 14 comprises lens element 14A having a positive power. In one embodiment, lens element 14A is made from zinc selenide (ZnSe). In one embodiment, lens element 14A is aspheric. Although second lens group 14 is described and depicted in FIG. 1 as having one lens element, second lens group 14 can have one, two or more lens elements.

In one embodiment, third lens group 16 comprises first lens element 16A, second lens element 16B and third lens element 16C. In one embodiment, first lens element 16A has a positive power, second lens element 16B has a negative power, and third lens element has a negative power. In one embodiment, lens elements 16A and 16C are made from germanium (Ge) and second lens element 16B is made from zinc selenide (ZnSe). In one embodiment, second lens element 16B has a kineform grating surface and lens elements 16A and 16C are aspheric. Although third lens group 16 is described above and depicted in FIG. 1 as having three lens elements, third lens group 16 can have any number of lens elements, for example, three, four or more lens elements.

In one embodiment, first lens group 12 is provided, inter alia, to correct axial chromatic aberration. In one embodiment, third lens group 16 is provided, inter alia, to correct lateral chromatic aberration. Third lens group 16 is further provided to correct a radiation field curvature to achieve a substantially planar focal surface or near zero Petzval sum on detector 18. For example, by providing a substantially planar focal surface or near zero Petzval sum on the detector this allows to minimize optical aberrations. Lens elements 12A, 12B, 12C, 14A, 16A, 16B, and 16C are centered around axis AA to define the optical axis of optical system 10.

The material from which the various lens elements in the optical system 10 are fabricated can be selected to transmit in the LWIR wavelength range between about 8 μm and about 12 μm. For example, the above materials Ge, ZnSe and AMTIR1 from which the various lens elements are fabricated transmit in the LWIR range. However, the various lenses can also be fabricated from other materials that transmit in the LWIR range.

In one embodiment, an entrance pupil aperture diameter (D) of optical system 10 is approximately 25.4 cm. In one embodiment, a focal length (F) of optical system 10 approximately 30.5 cm. Therefore, the speed or f-number (F/D) of optical system 10 is equal to about F/1.2 (i.e., less than F/2.0). In another embodiment, the optical system 10 can have any desired aperture diameter and any desired focal length, the goal being to achieve an f-number (i.e., a ratio of focal length to aperture diameter) less than about F/2.0, preferably less than F/1.5. In one embodiment, a diameter of lens element 12A is about 30.5 cm and a diameter of lens element 14A is about 35.6 cm. However, the dimensions of the various lens elements can be selected as desired for appropriate control of ray trajectories. Table 1 summarizes various features of optical system 10.

TABLE 1

| F/number | F/1.2 |
|---|---|
| Focal Length | 30.48 cm |
| Aperture | 25.4 cm |

TABLE 1-continued

| Designed Field of View | 54.51 degrees circular |
|---|---|
| Maximum C-FPA Diameter | 29 cm |
| IFOV | 39.37 μrad for 12 μm pixel |
| | 55.77 μrad for 17 μm pixel |
| Waveband | 8 μm-12 μm |

In one embodiment, detector 18, e.g., a focal plane array (FPA), is positioned at about 56 cm from the front surface of lens element 12A. In one embodiment, a maximum diameter of sensing area on the detector (e.g., FPA) is about 29 cm. In one embodiment, a circular field of view of optical system 10 is about 54.5 deg. In one embodiment, an instantaneous field of view (IFOV) of optical system 10, which refers to a solid angle through which one single detector is sensitive to radiation, can be from approximately 39.4 μrad for a 12 μm pixel on the detector 18 to approximately 55.8 μrad for a 17 μm pixel on detector 18.

Therefore, optical system 10 has a relatively wide field of view (FOV) in the LWIR wavelength range (e.g., the field of view is approximately 54.5 deg. greater than about 20 deg. or greater than about 40 deg.). In addition, optical system 10 is relatively fast (e.g., f-number is approximately F/1.2 less than F/2.0). In addition, optical system 10 has a relatively high resolution as will be described further in detail in the following paragraphs.

A resolution of optical system 10 is governed or controlled by the optics blur size and a pixel size within detector 18. In one embodiment, the optical resolution of optical system 10 depends on a blur originating from physical or optical limitations of the various lens elements in first, second and third lens groups 12, 14 and 16, and also depends on pixel size in detector 18. In one embodiment, once a type of detector 18 with a certain pixel size is selected, the geometrical parameters of the optical system 10 can be selected and/or adjusted to minimize geometrical aberrations.

Figure 2:
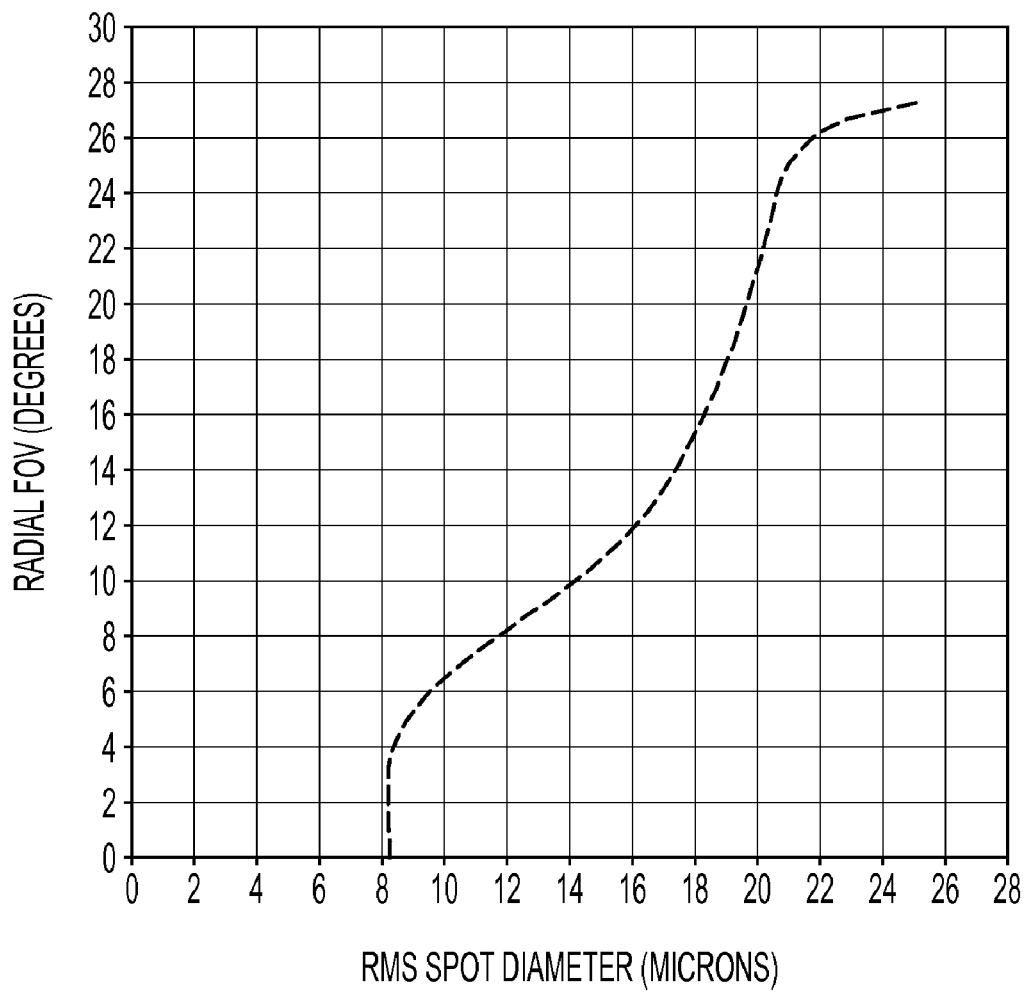
FIG. 2 is a plot of a radial FOV as a function of root mean square (RMS) spot diameter (in microns) obtained at detector of optical system depicted in FIG. 1.

FIG. 2 is a plot of a radial FOV as a function of RMS spot diameter (in microns) obtained at detector 18 of optical system 10. The radial FOV (between 0 deg. and about 27 deg.) is half of the entire FOV (between about −27 deg. to about 27 deg.). Only one half of the entire FOV is plotted in FIG. 2, as the other half of the FOV (from about −27 deg. to 0 deg.) varies in a same or rotationally symmetrical fashion as a function of RMS of spot diameter as the radial FOV (from 0 deg. to about 27 deg.). The RMS of the spot diameter provides a quantification of optical blur at detector 18 as the diameter of a spot on detector 18 varies as a function of radial FOV, and hence as a function of the position of the spot on detector 18. As shown in FIG. 2, for a radial FOV varying between 0 to about 27 deg., the RMS of the diameter of the spot at the detector 18 varies between about 8 μm to about 24 μm, or vice versa. The RMS spot diameter increases with increasing FOV. However, an adequate RMS spot diameter of less than about 25 μm (i.e., a relatively good geometrical resolution) can be obtained when using an optical system having a maximum FOV of about 54 deg.

Figure 3:
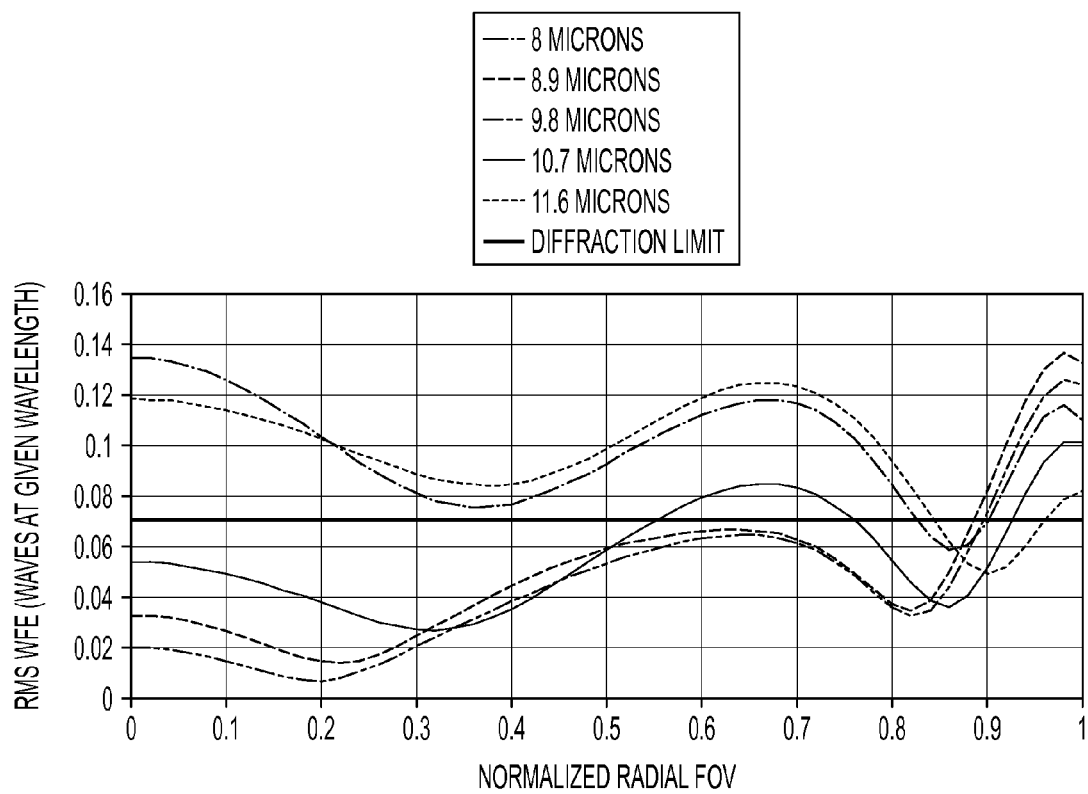
FIG. 3 is a plot of RMS wave front error (WFE) as a function of normalized radial FOV at various wavelengths in the range between 8 µm and 11.6 µm of optical system depicted in FIG. 1.

FIG. 3 is a plot of the RMS WFE as a function of normalized radial FOV at various wavelengths in the range between 8 μm and 11.6 μm. In this plot, the normalized radial FOV is normalized to the maximum radial FOV of approximately 27 deg. As shown in FIG. 3, the RMS WFE at various wavelengths has overall the same slightly oscillatory behavior as a function of the normalized radial FOV. In addition, as shown in FIG. 3, for example, for a normalized radial FOV around zero (i.e, for a radial FOV around 0 deg. at around axis AA of optical system 10), the RMS WFE varies between about 0.02 to about 0.14 for a wavelength in the range between about 8 μm and about 11.6 μm. An extent of the RMS WFE for all wavelengths or "colors" of interest in the range between 8 μm and about 11.6 µm (for example, at a radial FOV of around 0 deg.) defines a chromatic aberration of the optical system 10 at the radial FOV of about zero deg. As shown in FIG. 3, the extent of RMS WFE which defines the chromatic aberration is relatively small and less than 0.12. The extent of the RMS WFE (i.e., chromatic aberration) is equal to about 0.12 (0.14-0.02) at a radial FOV of about 0 deg. However, as shown in FIG. 3, the extent of the RMS WFE decreases overall with increasing radial FOV up to a normalized radial FOV of about 0.87. Hence, the chromatic aberration decreases with increasing FOV. The extent of the RMS WFE as a function of normalized radial FOV presents a relatively narrow waist at a normalized radial FOV of about 0.87 which is an indication that the RMS WFE is almost the same (around 0.05) for all colors or wavelengths in the range between 8 µm and 11.6 µm. As the extent of the RMS WFE is narrower at a normalized radial FOV of about 0.87, the chromatic aberration is consequently minimum at the normalized radial FOV of 0.87.

Figure 4:
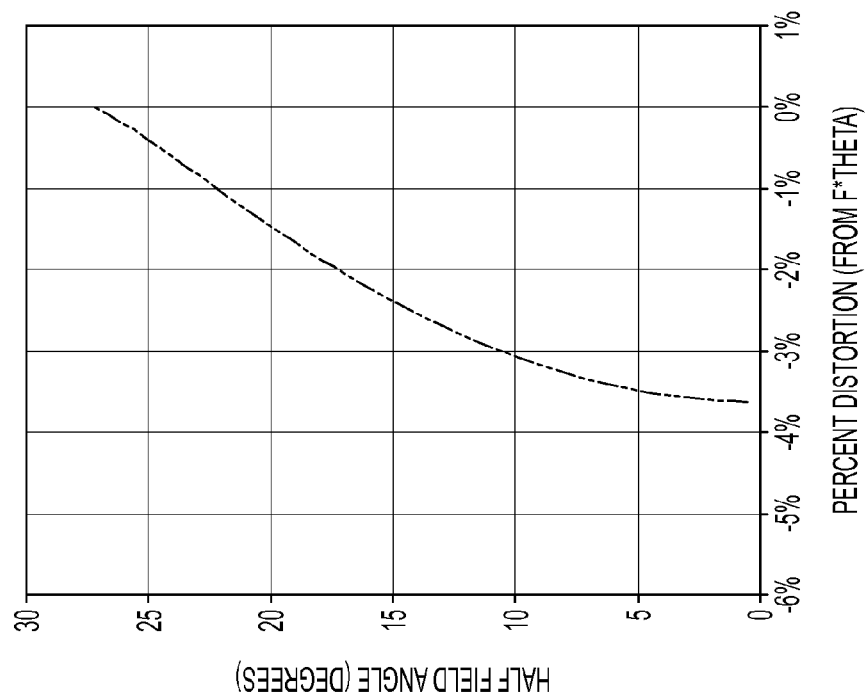
FIG. 4 is a plot of half field angle or radial FOV as a function of percent geometrical distortion for optical system depicted in FIG. 1.

FIG. 4 is a plot of half field angle or radial FOV as a function of percent geometrical or optical distortion for optical system 10. The percent optical distortion (PD) varies with the field of view (FOV). As expressed in equation (1), percent optical distortion (PD) is proportional to a ratio of a difference between nominal or theoretical product F*θ and actual F*θ divided by nominal F*θ, where F corresponds to the focal length of the optical system 10 and θ corresponds to the field angle in radians.

$$PD = 100\% * \frac{(F*\theta)_{ACTUAL} - (F*\theta)_{NOMINAL}}{(F*\theta)_{NOMINAL}} \quad (1)$$

In FIG. 4, the zero percent distortion is selected to be at the edges of the FOV (i.e., at the half-field angle or radial FOV of about 27 deg.). In this case, the percent distortion (PD) decreases to negative percentages with decreasing FOV. Similarly, one can also select the zero percent distortion to be at the center of the FOV (i.e., at zero deg. radial FOV). In which case, the percent distortion (PD) increases to positive percentages with increasing FOV towards the edges of the FOV. Therefore, the percent distortion has a minimum around a zero deg. radial FOV. As shown in FIG. 4, percent distortion (PD) is equal to about -3.75% at a radial FOV of about 0 deg. (around optical axis AA of optical system 10) and increases with increasing radial FOV to about 0% at around a radial FOV of about 27.5 deg. This behavior of PD as a function of radial FOV indicates that the geometrical distortion is minimal around the axis AA of optical system 10 and increases with increasing radial FOV.

Figure 5:
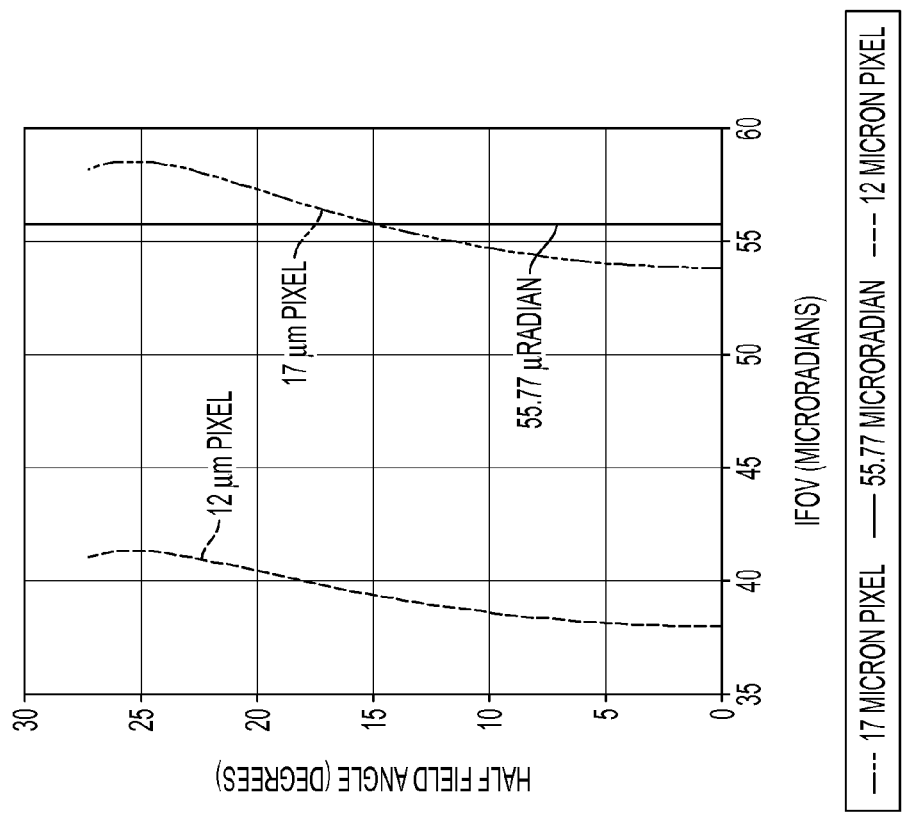
FIG. 5 is a plot of half field angle or radial FOV as a function of instantaneous FOV (IFOV) at a pixel size of about 12 µm and a pixel size of about 17 µm for the optical system depicted in FIG. 1.

FIG. 5 is a plot of half field angle or radial FOV as a function of IFOV for optical system 10 at a pixel size of about 12 µm and a pixel size of about 17 µm. As described in the above paragraph, IFOV relates to a solid angle through which a single pixel within detector 18 is sensitive to radiation and thus relates indirectly to pixel size. As shown in FIG. 5, the IFOV is around 40 µradians within the range of radial FOV of 0 deg. to about 27 deg. for a pixel size of about 12 µm. In addition, as shown in FIG. 5, the IFOV is around 55.8 µradians within the range of radial FOV of 0 deg. to about 27 deg. for a pixel size of about 17 µm. FIG. 5 shows that when using a detector with a pixel size in the range between about 12 µm and 17 µm, the obtained IFOV is in the range between about 44 µradians and about 55.8 µradians.

Figure 6:
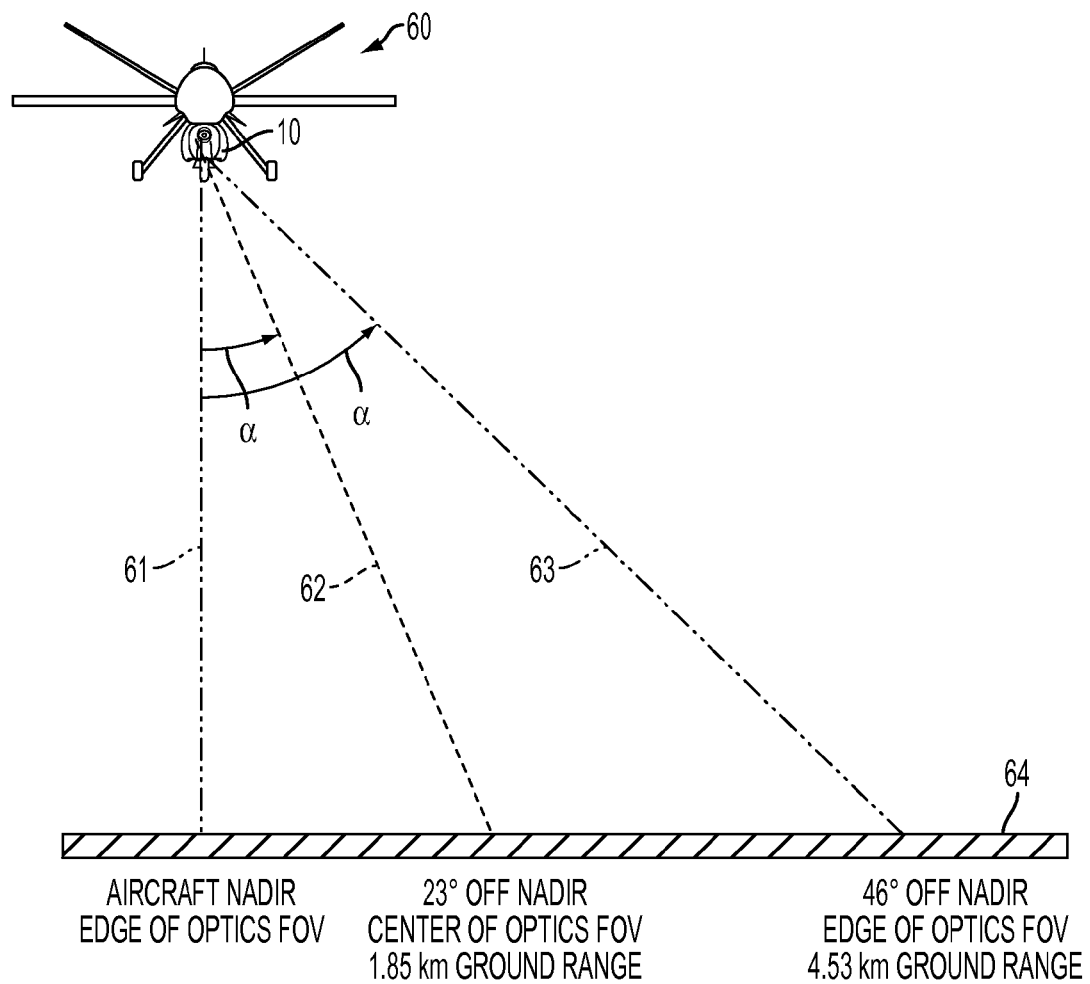
FIG. 6 is schematic diagram of position of an aircraft carrying optical system depicted in FIG. 1, according to an embodiment.

FIG. 6 is schematic diagram of position of aircraft 60 carrying optical system 10, according to one embodiment. In one embodiment, aircraft 60 is airborne at an altitude of about 20,000 feet (about 7 km). As shown in FIG. 6, the aircraft is nadir pointing optical system 10, as schematically depicted by dotted-dashed line 61. Also, as shown in FIG. 6, aircraft 60 can orient and point optical system 60 at an angle α of about 23 deg. relative to nadir direction 61, as depicted schematically by dashed line 62. In this position or orientation, ground 64 is at about 1.85 km ground range from nadir direction 61 of optical system 10. In this orientation, dashed line 62 coincides with optical axis AA of optical system 10 and is positioned at the center of the FOV of optical system 10. As shown in FIG. 6, the aircraft can orient and point optical system 10 at an angle α of about 46 deg. (2×23 deg.) relative to nadir direction 61, as depicted schematically by dotted line 63. In this position or orientation, ground 64 is at about 4.53 km ground range from nadir direction 61 of optical system 10. As it can be appreciated, optical resolution of optical system 10 decreases with increasing angle α relative to nadir direction 61.

Figure 7:
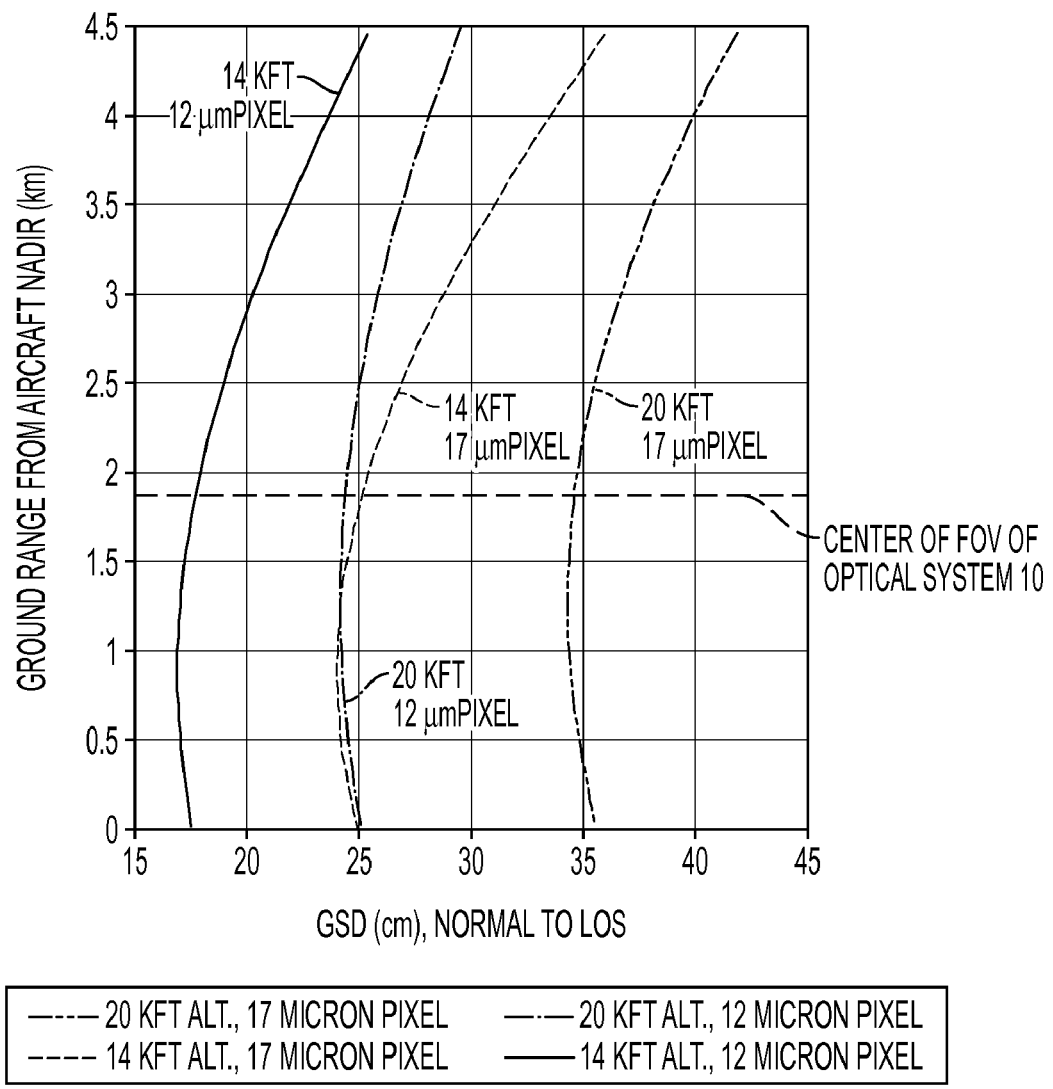
FIG. 7 is a plot of ground range from aircraft nadir (in km) as a function of ground sample distance (GSD), at various altitudes (14000 feet and 20000 feet) and for a detector in optical system depicted in FIG. 1 having a pixel size of about 12 µm and a detector having a pixel size of about 17 µm.

FIG. 7 is a plot of ground range from aircraft nadir (in km) as a function of ground sample distance (GSD), at various altitudes (14000 feet and 20000 feet) and for a detector 18 having a pixel size of 12 µm and a detector 18 having a pixel size of 17 µm, according to one embodiment. For example, when the aircraft carrying optical system 10 is at an altitude of about 20000 feet and detector 18 has a 12 µm pixel size, the ground sample distance (GSD) increases overall with increasing ground range relative to aircraft nadir 61. This provides the resolution that can be achieved by optical system 10 at a specific orientation α relative to nadir and at a specific altitude. In this instance, optical system 10 can resolve an object with a dimension between about 25 cm and about 30 cm when the aircraft is at an altitude of 20000 feet and the ground range varies between about 0 km (nadir) to about 4.5 km.

As can be seen from FIG. 7, for a same altitude position of aircraft 60 carrying optical system 10, GSD increases (and hence the resolution decreases) with increasing pixel size in detector 18. Also, for a same pixel size in detector 18, GSD increases (and hence the resolution decreases) with increasing altitude of aircraft 60 carrying optical system 10. Overall, even in a worst case scenario, when using 17 µm pixel detector at an altitude of about 20000 feet, a GSD less than 40 cm can be achieved by optical system 10. The GSD can be lowered to less than about 25 cm when using a detector with a smaller pixel size (e.g., 12 µm pixel) and when decreasing the altitude of aircraft 60 carrying optical system 10 (e.g., an altitude equal to about 14000 feet). Furthermore, when optical system 10 is staring at an object close to nadir direction 61 at a ground range of about 1 km from nadir, optical system 10 can achieve a GSD of less than 17 cm. Therefore, it can be said that optical system 10 provides relatively high resolution.

By designing optical system 10 with high resolution over a large FOV, a high resolution image of an entire area of interest can be captured simultaneously. Optical system 10 combines high resolution over a much wider field of view than existing systems. Optical system 10 also achieves a fast f-number which can eliminate the use of cooling systems for cooling detector 18 of optical system 10. As a result, optical system 10 is able to use inexpensive uncooled LWIR detector 18, which can decrease the overall cost of optical system 10.

A specific prescription for an embodiment of the optical imaging system 10 shown in FIG. 1 is provided in Table 2.

TABLE 2

| SURF | RD (inch) | AD | AE | AF | AG | TH (inch) | MEDIUM |
|---|---|---|---|---|---|---|---|
| 1 | 27.7032 | | | | | 0.599209 | Ge |
| 2 | 28.4384 | 9.24849E−05 | 1.29778E−07 | 4.13806E−09 | 4.95284E−11 | 1.70042 | AIR |
| 3* | 105.425 | | | | | 0.599809 | AMTIR1 |
| 4 | 22.1469 | −3.74586E−04 | 1.24569E−06 | −3.19407E−08 | 4.47760E−10 | 0.593229 | AIR |
| 5 | 35.2883 | −1.01437E−04 | −2.21514E−09 | −6.01534E−09 | 1.90835E−10 | 0.63729 | Ge |
| 6 | 1622.99 | | | | | 4.40889 | AIR |
| 7 | 139.541 | 1.82929E−05 | 6.54320E−08 | −5.67817E−10 | −2.84727E−11 | 1.00608 | ZnSe |
| 8 | −55.687 | | | | | 6.72526 | AIR |
| 9 | 29.653 | 1.64414E−05 | −4.00912E−07 | 8.58391E−10 | −6.92219E−11 | 1.12089 | Ge |
| 10 | −163.814 | | | | | 0.34677 | AIR |
| 11 | −77.8406 | | | | | 0.448016 | ZnSe |
| 12 | 30.3978 | 1.29576E−04 | 2.38927E−07 | 5.63198E−09 | 6.02711E−10 | 2.61934 | AIR |
| 13 | −16.8538 | 1.66970E−04 | 2.11245E−06 | −2.67190E−08 | 1.50998E−10 | 0.699546 | Ge |
| 14 | −26.9273 | | | | | 0.496072 | AIR |
| 17 | 0 | | | | | | |

*aperture stop

Table 2 are listed the various optical surfaces of optical system 10 and their respective radii of curvature (RD), aspheric coefficients (AD), (AE), (AF), and (AG), thickness (TH), and type of material (MEDIUM) when applicable. With this optical prescription, optical imaging system 10 achieves a FOV of approximately 54 degrees (circular) and an f-number (speed) of approximately F/1.18, in the wavelength range between about 8 μm and about 11.6 μm. With this prescription, the focal length of optical system 10 is approximately 11.38 inches and the entrance aperture diameter is about 9.64 inches.

The characteristics (phase fringe Zernike polynomial coefficients) of the kineform grating surfaces are provided in Table 3.

TABLE 3

| | Phase Fringe Zernike Polynomials | | |
|---|---|---|---|
| SURF | Z4 | Z9 | Z16 |
| 3 | −6.65942E−03 | 3.99485E−03 | 2.79644E−06 |
| 11 | −8.99930E−02 | 8.67139E−04 | 7.35434E−07 |

It should be appreciated that in one embodiment, the drawings herein are drawn to scale (e.g., in correct proportion). However, it should also be appreciated that other proportions of parts may be employed in other embodiments.

Although the inventive concept has been described in detail for the purpose of illustration based on various embodiments, it is to be understood that such detail is solely for that purpose and that the inventive concept is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Furthermore, since numerous modifications and changes will readily occur to those with skill in the art, it is not desired to limit the inventive concept to the exact construction and operation described herein. Accordingly, all suitable modifications and equivalents should be considered as falling within the spirit and scope of the present disclosure.

What is claimed:

1. An optical system having a system focal length comprising:
    a first lens group comprising a plurality of lenses located along an optical axis, the first lens group being configured to correct for an axial chromatic aberration, the first lens group comprising a first lens element disposed to receive optical radiation and having a negative power, a second lens element having a negative power and an aperture stop provided at a first surface of the second lens element closest to the first lens element, and a third lens element having positive power, wherein the first lens element and the third lens element comprise germanium and the second lens element comprises AMTIR-1;
    a second lens group comprising at least a fourth lens element having a positive power, the second lens group being disposed adjacent the first lens group and spaced apart from the first lens group by approximately ⅓ of said system focal length along said optical axis, the fourth lens element comprising zinc selenide; and
    a third lens group comprising a plurality of lenses, the third lens group being configured to correct for a lateral chromatic aberration, the third lens group being disposed adjacent the second lens group and spaced apart from the second lens group by at least ½ of said system focal length along said optical axis, the third lens group comprising a fifth lens element having a positive power, a sixth lens element having a negative power, and a seventh lens element having a negative power, wherein the fifth lens element and the seventh lens element comprise germanium and the sixth lens element comprises zinc selenide,
    wherein the first, second and third lens groups are selected and arranged to provide a wide field of view greater than approximately 20 degrees and an f-number of less than approximately F/2 in a wavelength range between approximately 8 μm and approximately 12 μm.

2. The optical system of claim 1, wherein the second lens element has a kineform grating surface.

3. The optical system of claim 1, wherein the sixth lens element has a kineform grating surface.

4. The optical system of claim 1, further comprising a detector positioned behind the third lens group, wherein the third lens group is configured to correct radiation field curvature and achieve a substantially planar focal surface or a near zero Petzval sum so as to minimize optical aberrations.

5. The optical system of claim 1, wherein the optical system has an aperture diameter of approximately 25.4 cm and a focal length of approximately 30.5 cm so as to achieve an f-number of approximately F/1.2.

6. The optical system of claim 1, wherein the field of view is approximately 54.5 deg.

7. The optical system of claim 1, further comprising a detector disposed behind the third lens group, wherein an optical resolution of the optical system is limited by blur due to optical limitations in one or more of the first lens group, second lens group, and third lens group and by a pixel size in the detector.

8. The optical system of claim 7, wherein the blur provides a root mean square (RMS) spot diameter obtained at the detector of less than approximately 25 μm.

9. The optical system of claim 8, wherein the RMS spot diameter obtained at the detector is between approximately 12 μm and approximately 18 μm.

10. The optical system of claim 8, wherein the RMS spot diameter increases slightly with an increasing field of view.

11. The optical system of claim 1, wherein the axial chromatic aberration of the optical system is defined by an extent of a root mean square (RMS) value of wave front error (WFE) between approximately 0.02 and approximately 0.14 in the wavelength range between approximately 8 μm and 12 μm.

12. The optical system of claim 11, wherein the extent of RMS WFE decreases with an increasing field of view.

13. The optical system of claim 1, wherein a percent optical distortion of the optical system varies with the field of view and the percent optical distortion has a minimum at around zero degree field of view and increases with an increasing field of view.

14. The optical system of claim 1, further comprising a detector disposed behind the third lens group, wherein the optical system provides an instantaneous field of view (IFOV) between approximately 40 μradians and approximately 55.8 μradians for a pixel size within the detector that is between approximately 12 μm and 17 μm.

15. The optical system of claim 1, wherein the first, second and third lens groups are selected and arranged to provide a wide field of view greater than approximately 40 deg.

* * * * *